US010565192B2

(12) United States Patent
Garagiola et al.

(10) Patent No.: US 10,565,192 B2
(45) Date of Patent: Feb. 18, 2020

(54) OPTIMIZING QUERIES AND OTHER RETRIEVE OPERATIONS IN A BLOCKCHAIN

(71) Applicant: International Business Machines Corporation, Armonk, NY (US)

(72) Inventors: Andres Garagiola, Buenos Aires (AR); Jeronimo Irazabal, Buenos Aires (AR); Raul Laprida, Capital Federal (AR); Guillermo R. Lopez, Buenos Aires (AR); Diego Masini, Buenos Aires (AR); Dulce B. Ponceleon, Palo Alto, CA (US)

(73) Assignee: International Business Machines Corporation, Armonk, NY (US)

( * ) Notice: Subject to any disclaimer, the term of this patent is extended or adjusted under 35 U.S.C. 154(b) by 129 days.

(21) Appl. No.: 15/665,760

(22) Filed: Aug. 1, 2017

(65) Prior Publication Data

US 2019/0042620 A1    Feb. 7, 2019

(51) Int. Cl.
| | | |
|---|---|---|
| G06F 16/2453 | (2019.01) |
| H04L 9/06 | (2006.01) |
| G06Q 20/40 | (2012.01) |
| G06F 16/951 | (2019.01) |
| G06F 16/23 | (2019.01) |
| H04L 9/32 | (2006.01) |
| G06Q 20/38 | (2012.01) |

(52) U.S. Cl.
CPC ...... *G06F 16/2453* (2019.01); *G06F 16/2379* (2019.01); *G06F 16/951* (2019.01); *G06Q 20/3827* (2013.01); *G06Q 20/401* (2013.01); *H04L 9/0637* (2013.01); *H04L 9/3239* (2013.01); *G06Q 2220/00* (2013.01); *H04L 2209/38* (2013.01)

(58) Field of Classification Search
CPC ............. G06F 11/1469; G06F 16/2453; G06F 16/951; G06F 16/2379; H04L 9/06; G06Q 20/38

See application file for complete search history.

(56) References Cited

U.S. PATENT DOCUMENTS

| | | | |
|---|---|---|---|
| 8,499,158 B2 | 7/2013 | Lee et al. | |
| 9,021,303 B1* | 4/2015 | DeSouter | G06F 11/1417 |
| | | | 714/15 |
| 9,397,985 B1 | 7/2016 | Seger, II et al. | |
| 2011/0214160 A1* | 9/2011 | Costa | H04L 63/0869 |
| | | | 726/3 |

(Continued)

FOREIGN PATENT DOCUMENTS

WO    2016204461 A1    12/2016

OTHER PUBLICATIONS

Manoj S P, Hyperledger & Smart Contracts, Open Source Solution's Specialist, IBM.

(Continued)

*Primary Examiner* — Cam Y T Truong (57) ABSTRACT

An example operation may include one or more of identifying a blockchain transaction, storing the blockchain transaction in a blockchain, assigning the blockchain transaction a transaction number and a block number, hashing a portion of blockchain transaction data associated with the blockchain transaction, and updating a blockchain index based on the hashed portion of the blockchain transaction.

20 Claims, 6 Drawing Sheets

(56) References Cited

U.S. PATENT DOCUMENTS

| | | | |
|---|---|---|---|
| 2015/0143112 A1* | 5/2015 | Yavuz | G06F 21/6227 |
| | | | 713/165 |
| 2016/0162897 A1 | 6/2016 | Feeney | |
| 2016/0261411 A1 | 9/2016 | Yau et al. | |
| 2016/0330034 A1 | 11/2016 | Back et al. | |
| 2016/0330180 A1* | 11/2016 | Egorov | G06F 21/6227 |
| 2016/0342988 A1 | 11/2016 | Thomas et al. | |
| 2017/0046689 A1* | 2/2017 | Lohe | G06F 12/1408 |
| 2017/0085555 A1 | 3/2017 | Bisikalo et al. | |
| 2017/0103472 A1 | 4/2017 | Shah | |
| 2017/0352012 A1* | 12/2017 | Hearn | G06Q 20/065 |
| 2018/0089041 A1* | 3/2018 | Smith | G06F 11/1474 |
| 2018/0268504 A1* | 9/2018 | Paolini-Subramanya | |
| | | | H04L 9/3236 |

OTHER PUBLICATIONS

Ryan Anderson et al., Bitsniffer: A tool for linkability analysis, ©virginia.edu Crypto Currency Cabal, CS 4501001, Fall 2015, University of Virginia.

* cited by examiner

OPTIMIZING QUERIES AND OTHER RETRIEVE OPERATIONS IN A BLOCKCHAIN

TECHNICAL FIELD

This application generally relates to optimizing operations, and more particularly, relates to optimizing queries and retrieval operations in a blockchain.

BACKGROUND

A blockchain may be used as a public ledger to store any type of information. Although, primarily used for financial transactions, A blockchain can store any type of information including assets (i.e., products, packages, services, status, etc.). A blockchain may be used to securely store any type of information in its immutable ledger. Decentralized consensus is different from the traditional centralized consensus, such as when one central database used to rule transaction validity. A decentralized scheme transfers authority and trusts to a decentralized network and enables its nodes to continuously and sequentially record their transactions on a public "block," creating a unique "chain" referred to as a blockchain. Cryptography, via hash codes, is used to secure the authentication of the transaction source and removes the need for a central intermediary.

Most blockchain implementations are designed to avoid linkability of the information contained in the respective transactions. This has a negative impact on the performance of every search an authorized entity could perform on the ledger. The simplest mechanism an authorized entity has at its disposal to search for a value in the ledger is by going over the whole chain of blocks decrypting each element. Once the decrypted block information is accessed, the authorized party must verify if the element it is searching for actually exists. This type of searching could be time-consuming and burdensome depending on the size of the ledger.

SUMMARY

One example method of operation may include one or more of identifying a blockchain transaction, storing the blockchain transaction in a blockchain, assigning the blockchain transaction a transaction number and a block number, hashing a portion of blockchain transaction data associated with the blockchain transaction, and updating a blockchain index based on the hashed portion of the blockchain transaction.

Another example embodiment may include an apparatus that includes a processor configured to perform one or more of identify a blockchain transaction, store the blockchain transaction in a blockchain, assign the blockchain transaction a transaction number and a block number, hash a portion of blockchain transaction data associated with the blockchain transaction, and update a blockchain index based on the hashed portion of the blockchain transaction.

Still another example embodiment may include a non-transitory computer readable storage medium configured to store instructions that when executed cause a processor to perform one or more of identifying a blockchain transaction, storing the blockchain transaction in a blockchain, assigning the blockchain transaction a transaction number and a block number, hashing a portion of blockchain transaction data associated with the blockchain transaction, and updating a blockchain index based on the hashed portion of the blockchain transaction.

DETAILED DESCRIPTION

It will be readily understood that the instant components, as generally described and illustrated in the figures herein, may be arranged and designed in a wide variety of different configurations. Thus, the following detailed description of the embodiments of at least one of a method, apparatus, non-transitory computer readable medium and system, as represented in the attached figures, is not intended to limit the scope of the application as claimed, but is merely representative of selected embodiments.

The instant features, structures, or characteristics as described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" may have been used in the description of embodiments, the application may be applied to many types of network data, such as, packet, frame, datagram, etc. The term "message" also includes packet, frame, datagram, and any equivalents thereof. Furthermore, while certain types of messages and signaling may be depicted in exemplary embodiments they are not limited to a certain type of message, and the application is not limited to a certain type of signaling.

The instant application in one embodiment relates to optimizing queries and retrieval operations in a shared ledger and in another embodiment relates to using an index for a blockchain to optimize the access attempts by third parties.

Example embodiments provide a trusted ledger, such as a blockchain, that could be used to store an index, which could be stored in a parallel data structure or embedded within the shared ledger itself, but in either case the index does not include any links to the ledger. The index could be used to identify and return a smaller set of data on which the auditor can search for the "X" value of interest. Also, the index may contain enough information to access the block directly which contains the "X" value. In order to generate an index, an internal structure is created in the block which enables the allocation of the hash structure, either during the storage process of the block or asynchronously.

Given that indexes are application specific, the data that should be indexed for a particular application may not be useful for another application. For instance, an application could permit partial searches for something, such as user social security numbers. In this case, the last four digits of the social security number could be used to generate the index. Another application could permit a search for reputation scores. Since a credit score is a numerical value, the approach in this case could be generating an index to search for ranges of values. Some applications could require personal data to be handled as sensitive data, so indexing would not be possible for certain values, such as disabilities, religion or race. This implies that a definition must be made for values that will be part of the index, the information's privacy level, and how to perform the index depending on the expected queries that the application should support.

According to one example embodiment, a special section may be included in a smart contract which includes a syntax to specify the instructions for generating the index. This section of the smart contract could be executed in the background by the blockchain member nodes authorized to access the information, or during the execution of the smart contract itself. Consensus by the blockchain members may be required for the resulting index to guarantee that it was not manipulated and to introduce a link to the index.

According to one example, a sample smart contract index declaration may provide:

```
@Index
struct indexSpec {
    @Mask(name=ss, value=xxxxxxxxNNNN)
    socialSecurityNumber string
    @Range(name=cs, ranges=[0...100,101..300,301..600])
    creditScore string
    @Skip
    phoneNumber string
}.
```

The mask would generate an index that enables partial searches, in this case, only the last four numeric values (marked with NNNN) would be included as part of the index. Any value marked with an x would be omitted from the index. The range would generate an index that enables searching for a range of values, for instance, get credit scores between 0 and 100. Skip would not generate an index for the value. This provides a high level of confidentiality for sensitive information.

After consensus and before committing the block, validators of the process could execute a particular smart contract function for each transaction on the current block. This execution could also be performed in the background. Validators would include all the indexes generated in the block metadata and then update the index structure whether it be internal or external to the ledger.

The index specification may be defined using a domain specific language. The language selected is generally to make it easier for the smart-contract developer to specify the data that will be used by the index generation operations. The domain specific language for defining index specifications would contain operations to mask and set a range, etc. The index specification generates a value that is taken as input by the index function (i.e., imperfect hash function).

This value will correspond to the index at which different blocks/transactions will be associated. This configuration makes it possible to find the block or blocks that contain transactions regarding certain values among the blocks that have been associated with the generated index by using the index specification and/or the hash function. Using a specific language, such as a domain specific language to define the index specifications, but not being limited to a particular set of constructions such as mask or range, permits ease of creation of the index specification.

An example declarative index may provide:

```
function generateIndex( ) int {
    // recover the indexSpec from the worldState and delete it.
    indexSpec := worldState.get('spec')
    worldState.delete('spec')
    // Generate the index using the indexSpec by applying the
    // appropriated mechanism, i.e., imperfect hash function,
    // among other tools.
    index := computeIndex(indexSpec)
    return index
}
function updateCreditScore(securityNumber string, phone string){
    currentScore = worldState.get(securityNumber)
    newScore = computeNewCreditScore(currentScore)
    // generate indexSpec using rules defined in [0017] for
    // this example and the values to index. Save the
    // generated spec for later use in the generateIndex
    // function. Notice that rules are already specified in the
    // indexSpec struct definition.
    values := indexSpec{securityNumber, newScore, phone}
    spec := applyIndexSpecRules(values)
    worldState.put('spec', spec)
    worldState.put('creditScore', new Score)
}
function applyIndexSpecRules(values struct){
    // following the definition provided in [0017] the rules
    // applied will truncate the social security number to the
    // last four digits, normalize the credit score to the
    // specified range and fill the phone number with blanks.
    for each v in values {
        apply(v.rule, v.value)
    }
}.
```

Figure 1A:
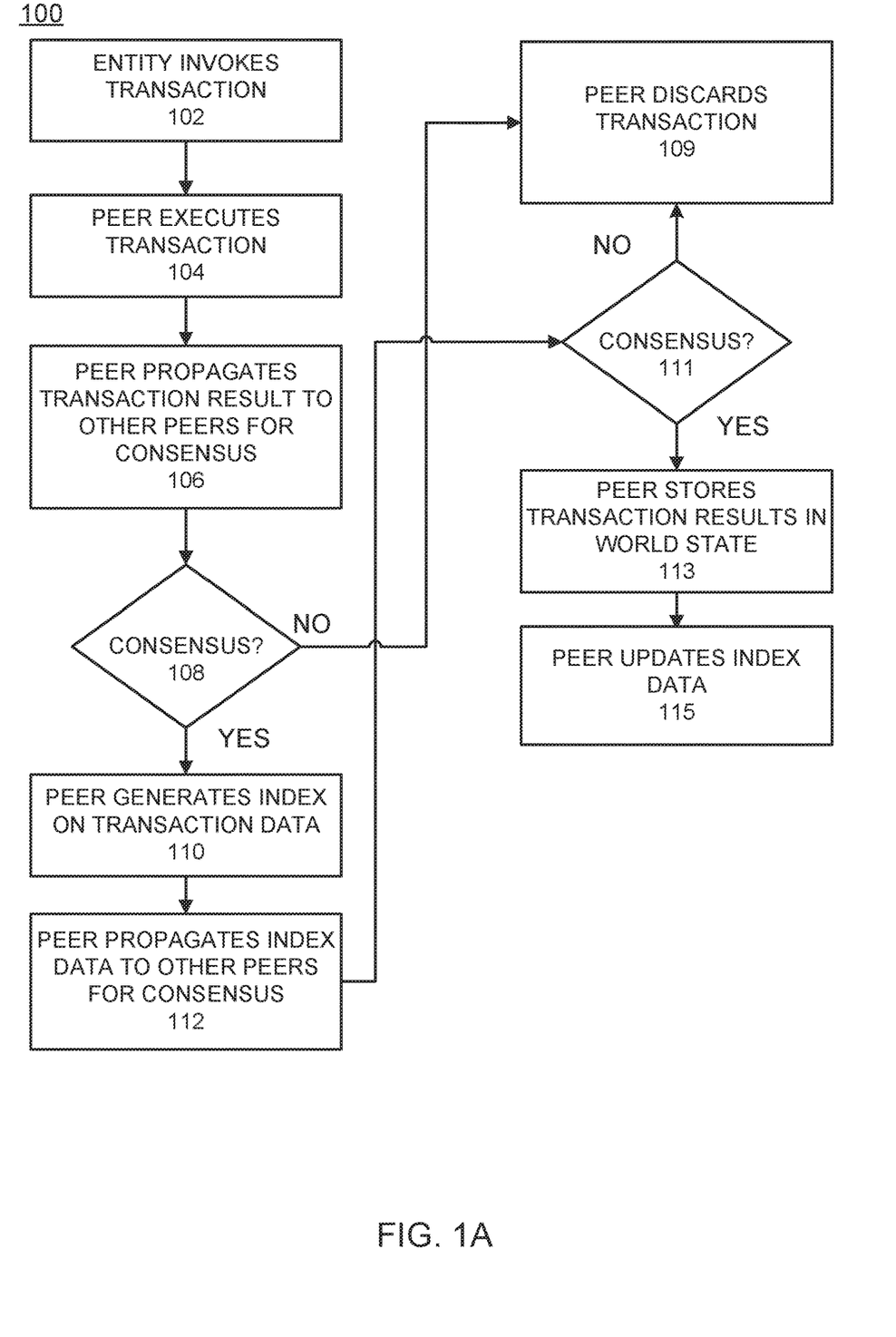
FIG. 1A illustrates a logic flow diagram of transaction processing and index creation, according to example embodiments.

FIG. 1A illustrates an example flow diagram of an index creation/update procedure according to example embodiments. Referring to FIG. 1A, the process 100 includes a transaction being evaluated as received from an entity 102. The entity (i.e., user, system, etc.) may interact with a computer application and submit a transaction to the blockchain. The transaction contains information of a smart contract operation to be executed along with the parameters needed for the execution of such operations. The transaction may be executed and prepared for commitment into the blockchain 104. The transaction is received by peers in the blockchain network. Each peer executes the smart contract operation specified by the transaction with the provided parameters.

The peer may propagate/broadcast the transaction data to the other peers to determine if consensus can be reached 106. Every peer that has executed the transaction propagates the results to the whole network. That way, peers can compare results in an attempt to reach consensus on the operation result. If consensus is not reached among the peers the transaction is discarded by the whole network. The decision 108 may cause the index to be generated 110 for the transaction data for easier searching by subsequent auditors. The peer may broadcast the index data as well to the other peers 112. The lack of consensus may yield the transaction to be discarded 109. Or, if consensus is reached 111, the peer may store the transaction results in the world state portion of the blockchain 113. In the event that consensus is reached, every peer generates an index on the data based on the transaction parameters and potentially on any data generated by the execution of the smart contract operation. The peer may update the index accordingly 115. Every peer that has generated the index propagates the index to the whole network. That way, peers can compare the index in an attempt to reach consensus on the resulting index. If consensus is reached every peer stores transaction results in the world state. The peers store the index data.

Given the distributed nature of a blockchain network, where data is replicated on every participant node, data should be protected for each participant. To achieve this result, transactions and data stored on the ledger should be encrypted, so unauthorized participants cannot access the data, and no patterns should be evident for any participant inspecting transactions, even when it is encrypted, or at least partially encrypted. Also, the blockchain should preserve 'unlinkability', which is the capability to not permit the linkage of data, encrypted or not encrypted. For example, for blockchain transactions of asset transfers between participants, each participant has an address to receive or transfer assets. For instance, transaction ID—TX1, encrypted payload—AF6748BCD991023, source address—0055A23FFCDA, destination address—00B3A123AACD. Other examples may include TX2, BD12589FF783AD2, 00B3A123AACD, 0055A23FFCDA, TX3, CDE823BD20ADCEA 0055A23FFCDA 00AAA657FFCE, and TX4, DABE1245DFA9312, 00AB31AADDBB and 00B3A123AACD.

In this example, even when the details of the transfers (i.e., amount, type of asset, etc.) are encrypted in the payload, and that the source and destination address don't identify a participant, transactions TX1 and TX3 can still be linked because they came from the same source address. Also, linking transaction TX2 is possible since it has a destination address, which includes the source address from TX1 and TX2. One way to avoid linkability in this example is to forbid an address to be used multiple times. Another way is to include the source and destination addresses in the encrypted payload.

A database index is a data structure that optimizes the speed of data retrieval operations on a database table. A blockchain index provides a similar result by optimizing the speed of data retrieval from a blockchain. Asset transfer may be performed by encrypting the source and destination address in the encrypted payload. For example, for a transaction ID TX1, the encrypted payload is AF6748BCD991023FED1453778ADECF7, for a second transaction TX2, the encrypted payload may be BD12589FF783AD2ABD1578811A678AB, and for TX3, CDE823BD20ADCEADC556ADE13EEC12D, and TX4, 456ADABE1245DFA9312DDFEAE125119. In this example, the encrypted payload contains the source and destination addresses. If the goal is to identify which transactions include a given source address, to provide an answer to that it is assumed that there is adequate encryption for authorization to access the decryption key, then iteration over every transaction may be necessary, and to decrypt the payload and compare the content with the source address we are looking for.

This type of configuration may not scale well when the number of transactions increases, such as the time needed to fulfill such a query increases linearly with the number of transactions in the blockchain. Also, this requires breaking the privacy aspect of blockchain, since it requires the decryption key to be able to perform a query on the data. To optimize the time to solve the query an index can be built based on the data. For example, a table with two columns can be created to store the index, in the first column the source address or the result of some function applied to the source address may be stored, and in the second column the transaction ID may be used, or IDs, if there are more than one transaction with that source address where that address can be found. This index could be generated before the payload is encrypted since the source address value is still needed. For the first column of the table, a MD5 hash function may be used. For instance, MD5(source address) 67e81a7bd8857e2b98f78e0b17a88082 for transactions TX1 and TX3, b732f11ca8da121b91cef800ad308b55 for transaction TX2, and 91f89176e178ec840657d2fe492d426f, for transaction TX4. Now this table can be used to quickly identify in which transaction the source address 00B3A123AACD was used. We just need to apply the MD5 hash function to the value 00B3A123AACD, search for the result on the first column of the index table, and then on the second column the transaction (or transactions) associated with the source address will be used. In this case, the result will be TX2, since MD5(00B3A123AACD)= b732f11ca8da121b91cef800ad308b55, and b732f11ca8da121b91cef800ad308b55 corresponds to the second row in the index table.

Following the same procedure, the transactions can be identified which have the source address 0055A23FFCDA. By applying the MD5 function to the source address TX1 and TX3 will be identified as having 0055A23FFCDA as the source address. The index table works in this case and accelerates the query time and does not require having the decryption keys, nor does it require iteration over the whole blockchain. However, linkability is still present since by applying the index, TX1 and TX3 came from the same entity.

Example embodiments provide index optimization and preserve unlinkability. The approach accelerate queries, reduces the chance for linkability, is tamper proof and should preserve privacy. The index may operate at the block level by either having the index return a smaller set of data on which the value that is being queried for would be found, or it may contain enough information to access directly to the block containing the value sought by the query. The index creation is subject to a consensus phase by the blockchain members before accepting the index. Every node of the blockchain network should compute the index on the data, and if they reach consensus then the index is valid. This minimizes the chance of a node altering the index to introduce linkability or to violate privacy. Also, considering that what could be private for a given application may not be private for another application, data should be indexed and handled according to a particular policy. A declarative approach may be specified in a smart contract as to how an index should be constructed.

One approach to submitting the declarative syntax for indexes may include a smart contract being used to update the credit score for a person. To identify that person, a social security number can be used along with a phone number. Given the sensitivity of the social security number, the only party indexed may be the last four digits. This may be indicated by using a mask directive. By indexing only part of the social security number, queries allowed may only have the last four numbers without revealing the entire value. The phone number is also a sensitive piece of information, in this example, the phone number may not be indexed or it may be the last four digits only as well. A skip directive may be used to disown such information, so no query by phone number will be supported. Also, the credit score is also sensitive, but in order to support some limited queries on that information, a range directive may be used which would generate an index that would permit a query for ranges of a credit score, instead of asking for a specific score, a query such as who has a credit score between 301 and 600 may be used instead.

One example of such a requirement specified in the smart contract may include:

```
@Index
struct indexSpec {
    @Mask(name=ss, value=xxxxxxxxNNNN) socialSecurityNumber
    string
    @Range(name=cs, ranges=[0..100,101..300,301..600]) creditScore
    string
    @Skip phoneNumber string
}.
```

In this example, 'mask' would generate an index that enables partial searches, in this case, only the last four numeric values (marked with NNNN) would be included as part of the index. Any value marked with an 'x' would be omitted from the index. Range would generate an index that enables searching for a range of values, for instance, get credit scores between 0 and 100. Skip would not generate an index for the value. This provides a high level of confidentiality for sensitive information. Once the entity performing the query on the blockchain obtains the block(s) that potentially contain the required data, a decryption on this data is still needed, as a standard practice, blockchain may keep data encrypted. As a result, only authorized entities would be able to access the data.

One example embodiment may include using an implementation with the following procedures: KeyGen(1^, C)→ (pk,vk): Receives a security parameter and a F-arithmetic circuit "C" and produces a providing key "pk" and a verification key "vk". Next, Prove(pk,x,a)→: receives a providing key "pk", a sentence "x" and an auxiliary input "a" called the witness and produces a non-interactive proof. Verify(vk,x)→b: Receives a verification key "vk", a sentence "x" and a non-interactive proof, and returns a boolean 'b' indicating whether the proof verifies the sentence. The index generation process uses the prove procedure in order to create a crypto proof which proves if an index sentence "x" is true or not. This proof has to be related with the block. Anyone with access to the verification key "vk" could execute the verify procedure in order to detect if the block should be considered or not in a query.

The index structure could be defined as a record with an identifier for value X and a list of blocks that could contain the value X. For example, Hash(X)=Block1, Block3, Block10, Block22, . . . . The index could be used to return a smaller set of data on which the "X" value would be found. It may contain enough information to access directly to the block containing the "X" value. The structure described previously accommodates for both options. In the case of option 1, not all the listed blocks will contain the 'X' value but at least one of the blocks will. For the second option, only blocks containing the X value will appear in the list. Hash(X) is a function that takes the value X and returns a binary representation of it. This representation could be unique or not. One example for the hash function could be a Bloom Filter.

Figure 1B:
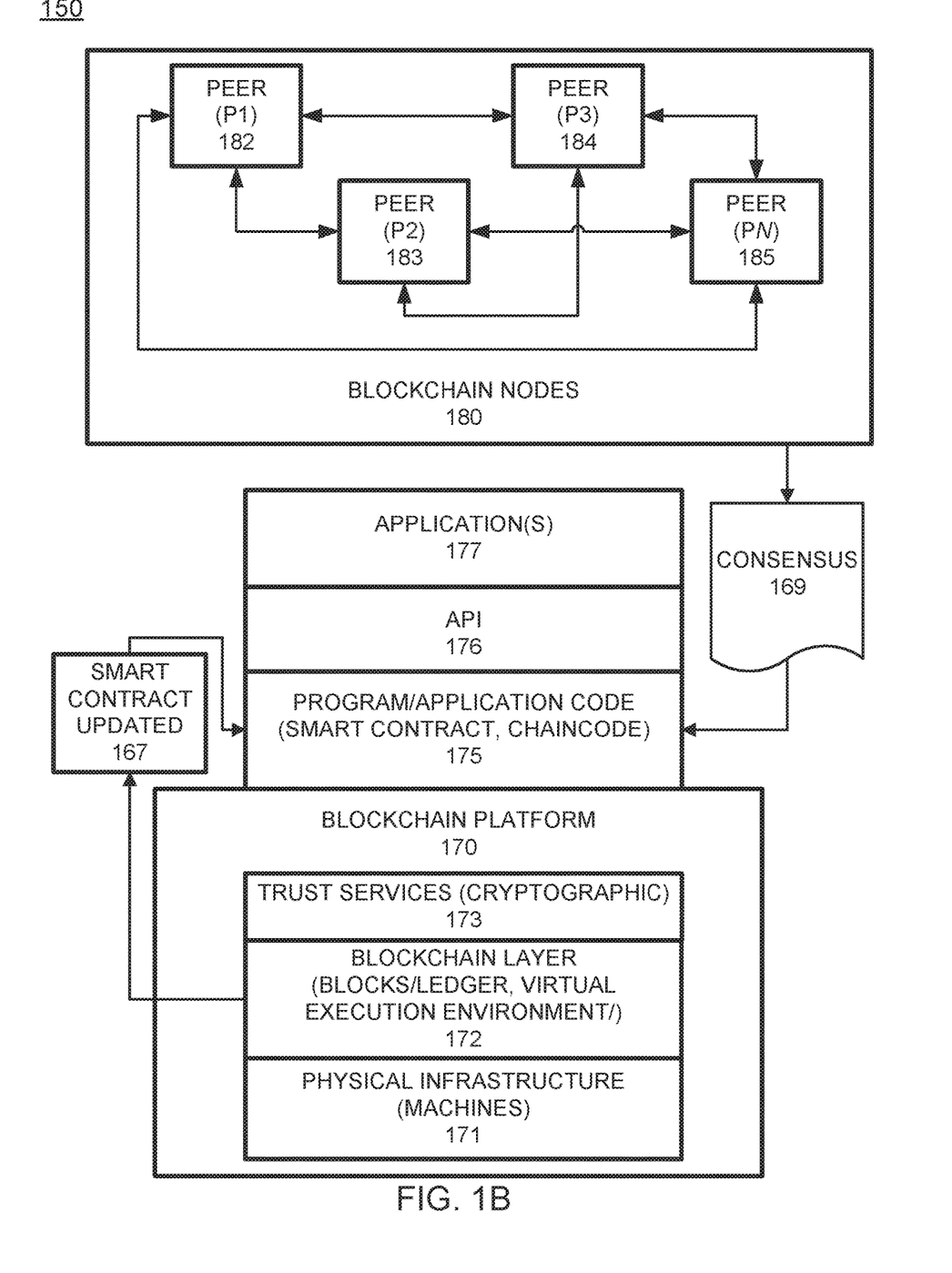
FIG. 1B illustrates a blockchain system configuration according to example embodiments.

FIG. 1B illustrates a blockchain system configuration according to example embodiments. The blockchain system 150 may include certain common blockchain elements, such as a group 180 of assigned peers 182-185 which participate in the blockchain transaction addition and validation process (consensus). Any of the blockchain peer nodes 180 may initiate new transactions and seek to write to the blockchain immutable ledger 172, a copy of which is stored on the underpinning physical infrastructure 171. In this configuration, the customized blockchain configuration may include one or applications 177 which are linked to APIs 176 to access and execute stored program/application code (e.g., chain code and/or smart contracts) 175, which are created according to the customized configuration sought by the participants and can maintain their own state, control its own assets, and receive external information. This code can be deployed as a transaction and installed, via appending to the distributed ledger, on all blockchain peer nodes.

The blockchain base 170 includes the various layers of blockchain data, services (e.g., cryptographic trust services, virtual execution environment), and underpinning physical computer infrastructure necessary to receive and store new transactions and provide access to auditors which are seeking to access data entries. The blockchain layer 172 exposes an interface that provides access to the virtual execution environment necessary to process the program code and engage the physical platform 171. Cryptographic trust services 173 are used to verify transactions and keep information private. As a result, smart contract changes which are proposed and/or approved (i.e., via consensus among peers) can be created and updated on the blockchain to accurately update consumer debt information.

The blockchain configuration of FIG. 1B may process and execute program/application code 175 by way of the interfaces exposed, and the services provided, by blockchain platform 170. The code may control blockchain assets, for example, it can store and transfer data, and may be executed by the blockchain in the form of a smart contract, which includes chain code with conditions or other code elements subject to its execution. The smart contracts 175 may be created to execute reminders, updates, and/or other notifications subject to the changes, updates, etc. The smart contracts can themselves be used to identify rules associated with index data requirements and usage. For example, the index may be defined by terms in the smart contract. The policies and updates 167, once decided by the peers via consensus 169, can be updated into the smart contracts 175 accordingly.

In this example, an index may be stored in the blockchain to reflect peer reviews of blockchain content. The more reviews received and stored by more peers the greater the validity of the content that was reviewed. For example, if content is supposed to be reviewed, then if 5 peers have reviewed the content, then the index may be updated to reflect a first level of review approval. However, if 10 peers have reviewed the content, the index may be incremented each time to reflect the additional peer approval. This may be translated to a score reflecting the relative validity of the content. The index is modified each time in the blockchain to score the content of a transaction.

Figure 2:
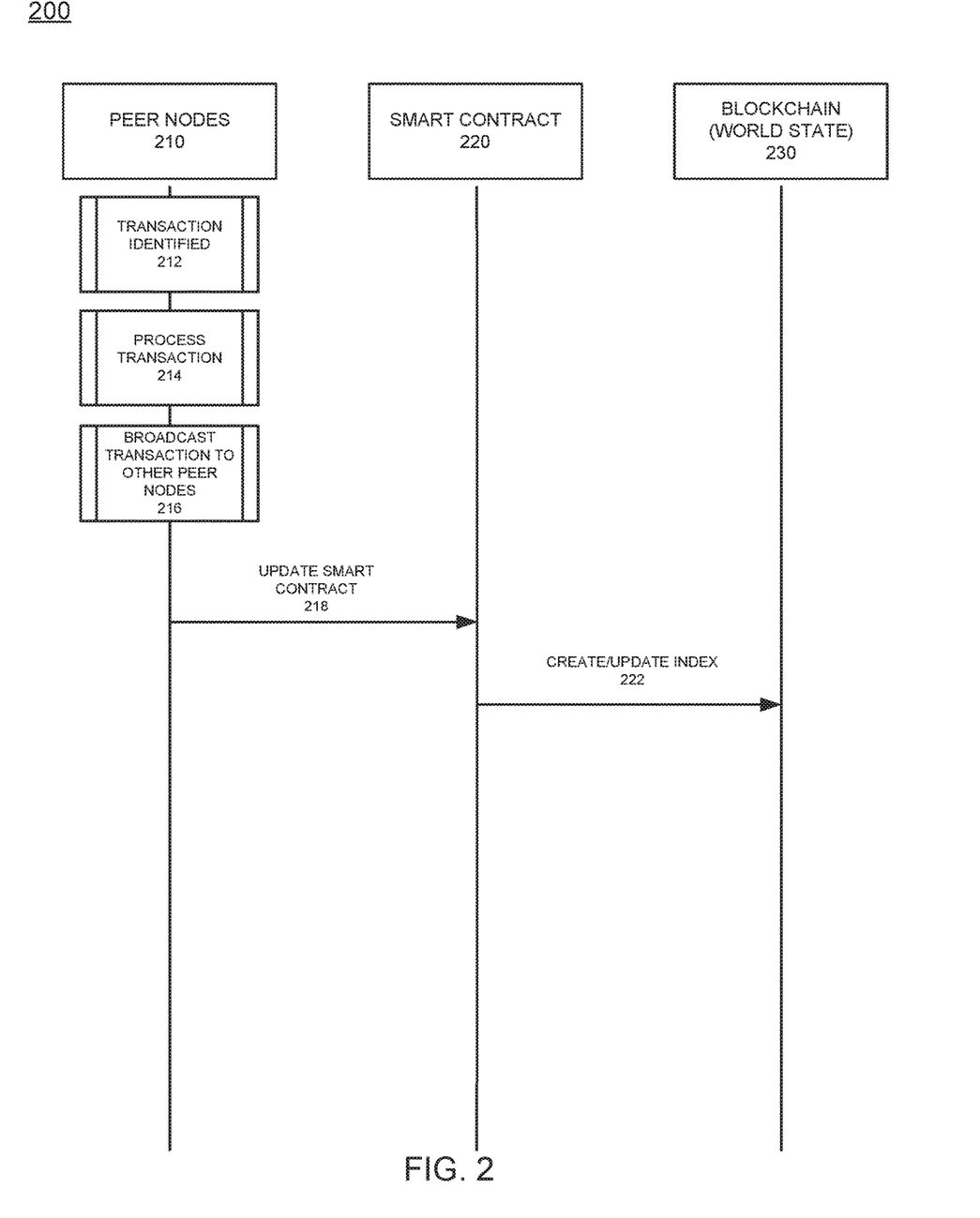
FIG. 2 illustrates a system messaging diagram of the interactions between blockchain members and a smart contract(s) of the blockchain, according to example embodiments.

FIG. 2 illustrates a system messaging diagram 200 for updating a smart contract according to an approved index update according to example embodiments. Referring to FIG. 2, the system 200 may include a number of components or modules which may include software, hardware or a combination of both. The components may include a first component, such as peer nodes 210 which may identify any new transactions 212, process the data in the transactions 214 and broadcast the data to the other peers 216 for approval/consensus. The consensus approval or decisions in the positive may yield updates 218 to a second component, such as smart contracts 220 to reflect the rules and policies of the index. The approved changes may be made to the index 222 and stored in a third component, such as a blockchain 230. In a further example, an actor/entity (user, system, etc.) sends an invoke transaction to a peer node that is part of the blockchain network. This transaction triggers the execution of the smart contract operation, where an index specification is generated based on the rules specified in the smart contract and using the parameters received. The resulting specification is stored in the blockchain's world state.

In one embodiment, the first component, the second component and the third component may be separate devices such as servers, computers or other computational devices or may be a single device. In other embodiments, the first component and the second component may be enclosed as, or perform as, a single device, the first component and the third component may be enclosed as, or perform as, a single device, and the second component and the third component may be enclosed as, or perform as, a single device. The components or devices 210, 220 and 230 may be directly connected or communicably coupled to one another, in a wired or wireless manner, and may reside locally and/or remotely.

At a later time, a different actor/entity, which could be an external actor, a process of the same system and/or a scheduled action, triggers the execution of the generateIndex( ) operation. The specification created previously is read from the world state and deleted. Based on the data contained in this specification, an index is computed and returned. The generated index could be stored in the same blockchain as part of the world state, in an external system, or in an external blockchain.

Using the declarative syntax, a smart contract developer may indicate how data and which data will be used to generate the index. An example provides a smart contract which is created to declare an updateCreditScore( ) operation. In this example, the smart contract is deployed (installed) to a blockchain network. When an entity (user, system, etc.) submits a transaction to trigger the execution of the updateCreditScore( ) operation, the code of the operation uses the index specification to generate 'indexSpec' that will be used to compute the index at a later step. In this particular case, by using the predefined rules, the result may yield taking the last four numbers of the social security number, normalizing the credit score to one of the following ranges: 0 to 100, 101 to 300 or 301 to 600, and populating the phone number with blanks. This data is stored in the world state by the updateCreditScore( ) code. Later, the generateIndex( ) operation is invoked, this operation reads the world state to recover the indexSpec data generated previously and then computes an index by using one of the options, such as imperfect hash functions, bloom filters, zkSnarks, etc. The generated index data includes a hash on the data and the block number where the transaction is contained. This index data could be stored in the same blockchain, as part of the world state, in an external structure or even in an external blockchain. Every time the updateCreditScore( ) operation is invoke the flow described previously takes place, updating the whole index by appending new entries.

According to one example embodiment, there may be a smart contract stored on a blockchain. that creates indexes based on the last four digits of social security numbers. A first transaction may include a first user 'A' with a four digit social security number portion A-1111, this transaction is committed to the ledger in block number 1000. The last four digits '1111' are used as input to a hash function 'h', and as a result, the function may be h(1111)=790. As for index key 790, an entry may be added "blocknumber1000". If later a party wanted to find the transaction in the ledger that involved a user with social number 1111, the last four digits are identified '1111', and the hash function 'h', or more specifically h(1111)=790, may be iterated over the entries on that index key and in one of such entries the block is identified that contains a transaction for that particular social number segment instead of having to look for that number against the entire ledger. The same index key (790) could contain several entries, for instance, one entry every time the chaincode is invoked with the same social security number, but also it could also be the case that the same index key may be shared by several social security numbers.

In one example, when a blockchain transaction is processed and validated, then the index creation occurs. The index creation may be based on the input data used to execute the transaction, the data that was already maintained by the smart-contract and/or the data obtained after executing the transaction. The developer of the smart-contract, specifies which portions of the input data are to be used to generate the index key. But the index keys will be generated when a client sends a transaction to blockchain, such as a request for the execution of the smart contract and providing input for its execution. One example of the inputted data may be, for example, a social security number as noted in the example of user 'A' having a last four of the social of '1111'. Once the smart-contract is deployed and ready to receive transactions, such as requests of execution by users, the creation of the index key for such transaction(s) may provide various operations. One example may provide that the transaction is processed and the smart-contract is executed using input data a user provided for that transaction. Before or after the transaction is processed, data is collected according to the index specification (e.g.: last four digits of the social security number provided as input to the transaction). The index key is generated by computing a hash function with the data collected (i.e., last four of the social security number) and the transaction is processed. The transaction is committed into the ledger and the transaction content may include index key, since the state of the smart-contract is maintained in a persistent media for rapid access. A similar technique can be used to maintain the index keys with the corresponding entries for a rapid look-up operation performed subsequently. The index creation is an extra operation that enables the rapid finding of the blocks, where transactions regarding certain data (e.g., a social security number) were stored.

Example embodiments provide for incremental generation of a blockchain index based on a blockchain transaction. For example, each index key is generated by applying a composition of functions to the data used to process the transaction or the data included in the transaction itself. The entries for each index key may identify a subset of the entire ledger. Additionally, a declarative language may be used to specify one or more functions that are applied to generate the index key. The language may contain, but is not limited to ranging or masking the data available, when the transaction is being processed. The function(s) applied to calculate the index key may be a cryptographic hash function, also the generated index may be stored within the ledger itself. Also, a subset or all index entries are encrypted with the same or a different cryptographic method and/or secret key.

In this example, user 'A' may have a social security number of XXX-XX-1111 and may submit a transaction TxA to the blockchain. That 'TxA' transaction is committed to the blockchain as part of a block (i.e., '7') and TxA is then assigned transaction number, for instance, 123. The indexing process for this transaction takes the visible part of the security number XXX-XX-1111 (that is 1111) and applies the hash function hash(1111)=790. A new entry is added to the index with the following information: 790, 7, 20 which indicates transactions corresponding to the hash of 1111 are located at blocks 7 and 20. This process is repeated for every transaction that is committed to the blockchain. Additionally, if another transaction with the same last four digits of a social security number is submitted, for instance, user 'B' with social security number ZZZ-ZZ-1111 submits a transaction 'TxB' to the blockchain, then TxB is committed to the blockchain as part of a different block, (i.e., 20) and TxB is then assigned, for example, transaction number 516. The indexing process for this transaction takes the visible part of the security number ZZZ-ZZ-1111, which is '1111' and applies the hash function to it hash(1111)=790. An entry in the index with the value 790 already exists, so the block number of this transaction is appended to that entry, resulting in 790, 7, 516. This provides that transactions corresponding to the hash of 1111 can be found at blocks 7 and 20.

The index key is referring to a unique identifier used to lookup inside the index table to find the which blocks can contain a specific value. In one example, if a user is searching for transactions with a social security number ending in 1111, then the value 1111 needs to be hashed hash(1111)=790, and that value is then used to look inside the index and retrieve the blocks where the transactions could be found, in this specific example, block 7 and block 516. The search could be described as having the operations which include user C wanting to find transactions which social security number ending in 1111, user C's user device hashes the value 1111, by performing hash(1111)=790. Using the hashed value, the user device accesses the entry with key (identifier) 790 from the index table. User C accesses the content of the entry and finds out that transactions with social security numbers ending in 1111 can be found at blocks 7 and 20. Instead of searching the entire blockchain of transactions to find the ones with social security number ending in 1111, the searcher just needs to access the transactions stored in block 7 and block 20, reducing the time required to solve this particular query.

Figure 3A:
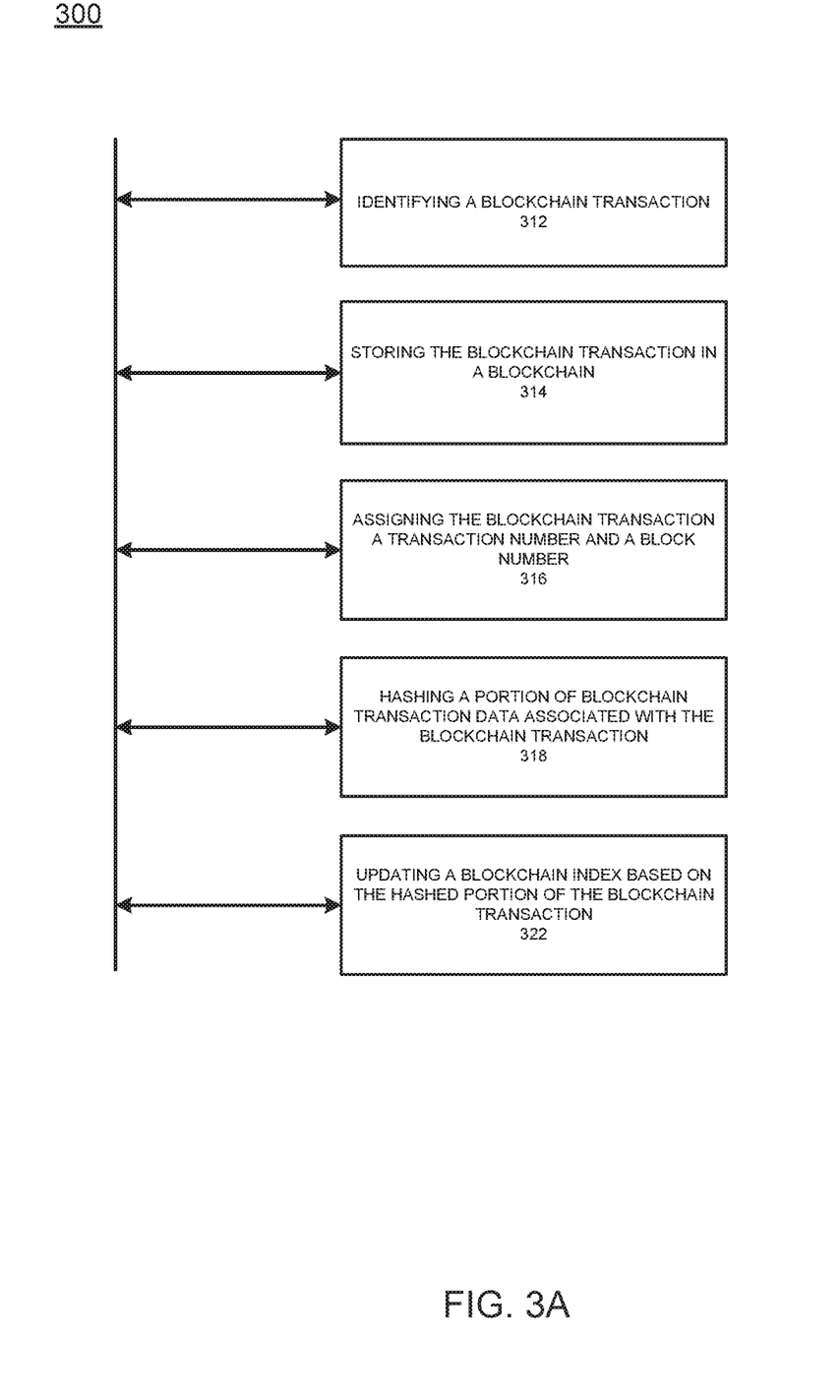
FIG. 3A illustrates a flow diagram of an example method of managing a data index in the blockchain, according to example embodiments.

FIG. 3A illustrates a flow diagram of an example method of managing a data index in the blockchain, according to example embodiments. Referring to FIG. 3A, the method 300 includes identifying a blockchain transaction 312, storing the blockchain transaction in a blockchain 314, assigning the blockchain transaction a transaction number and a block number 316, hashing a portion of blockchain transaction data associated with the blockchain transaction 318, and updating a blockchain index based on the hashed portion of the blockchain transaction 322.

The method may also include updating the blockchain index by adding a new entry to the blockchain index that includes the hashed portion of the blockchain transaction data and a block number. A declarative language is used to specify one or more functions applied to generate an index key that includes one or more of a range of values and a masked portion of the blockchain transaction data. The method may also include broadcasting the blockchain index to a plurality of blockchain peers for consensus approval in certain instances. The one or more functions applied to generate the index key may provide a cryptographic hash function. The method may also include a subset of index entries of the blockchain index which are encrypted with a same or different cryptographic key. The method may also include storing the blockchain index in the blockchain.

Another example method of operation may include identifying a blockchain transaction, broadcasting the blockchain transaction to a plurality of blockchain peers for a consensus decision, receiving a response corresponding to the consensus decision, and updating a blockchain index based on the blockchain transaction, and the updated blockchain index may include a range of values and a masked portion of data.

Figure 3B:
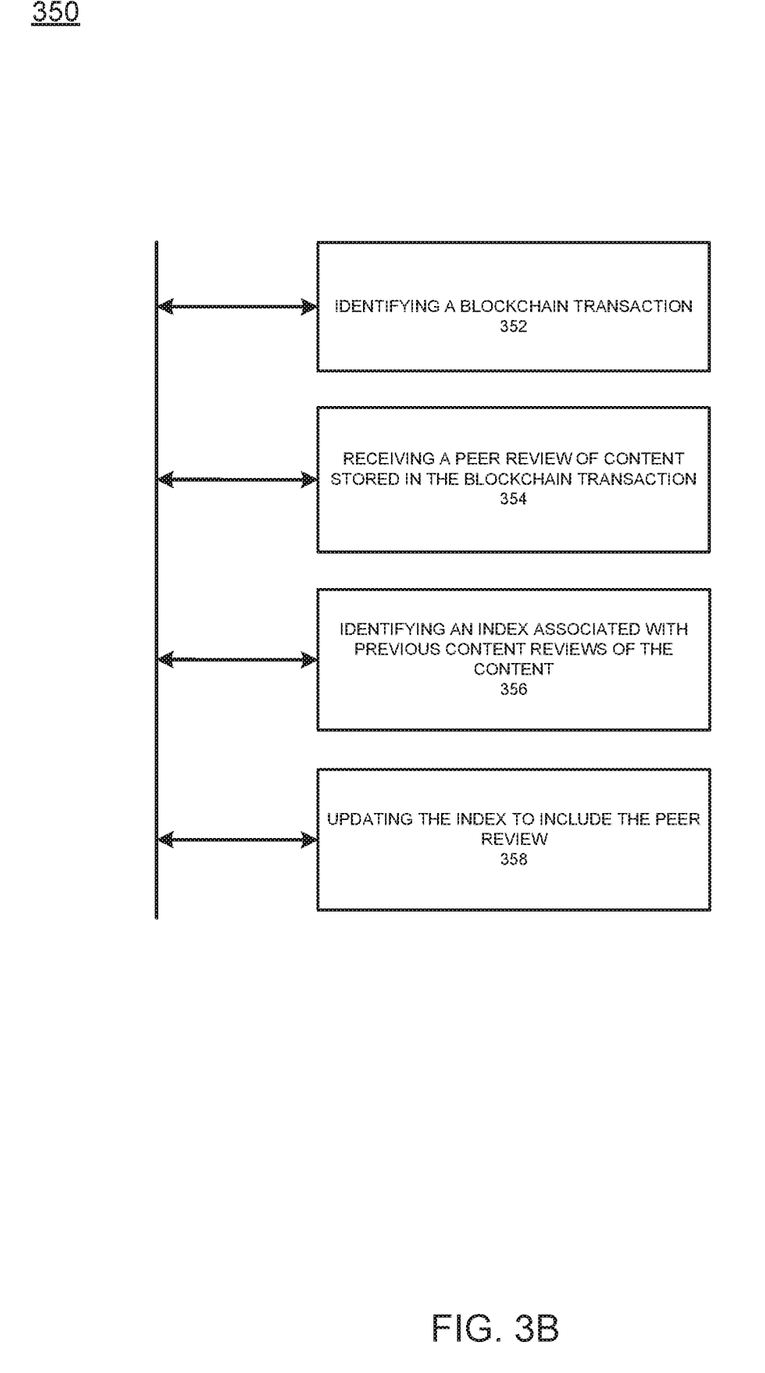
FIG. 3B illustrates a flow diagram of an example method of managing a data index in the blockchain, according to example embodiments.

FIG. 3B illustrates a flow diagram of an example method of managing a data index in the blockchain, according to example embodiments. Referring to FIG. 3B, the method 350 may include identifying a blockchain transaction 352, receiving a peer review of content stored in the blockchain transaction 354, identifying an index associated with previous content reviews of the content 356 and updating the index to include the peer review 358.

In this example, the content of the blockchain transaction may be reviewed and compared to previous content reviews in an effort to determine the type of content that is being reviewed prior to consensus. This approach enables the members of the blockchain to reference previously stored content to ensure the content is appropriate for commitment to the blockchain.

The above embodiments may be implemented in hardware, in a computer program executed by a processor, in firmware, or in a combination of the above. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example, FIG. 4 illustrates an example network element 400, which may represent or be integrated in any of the above-described components, etc.

Figure 4:
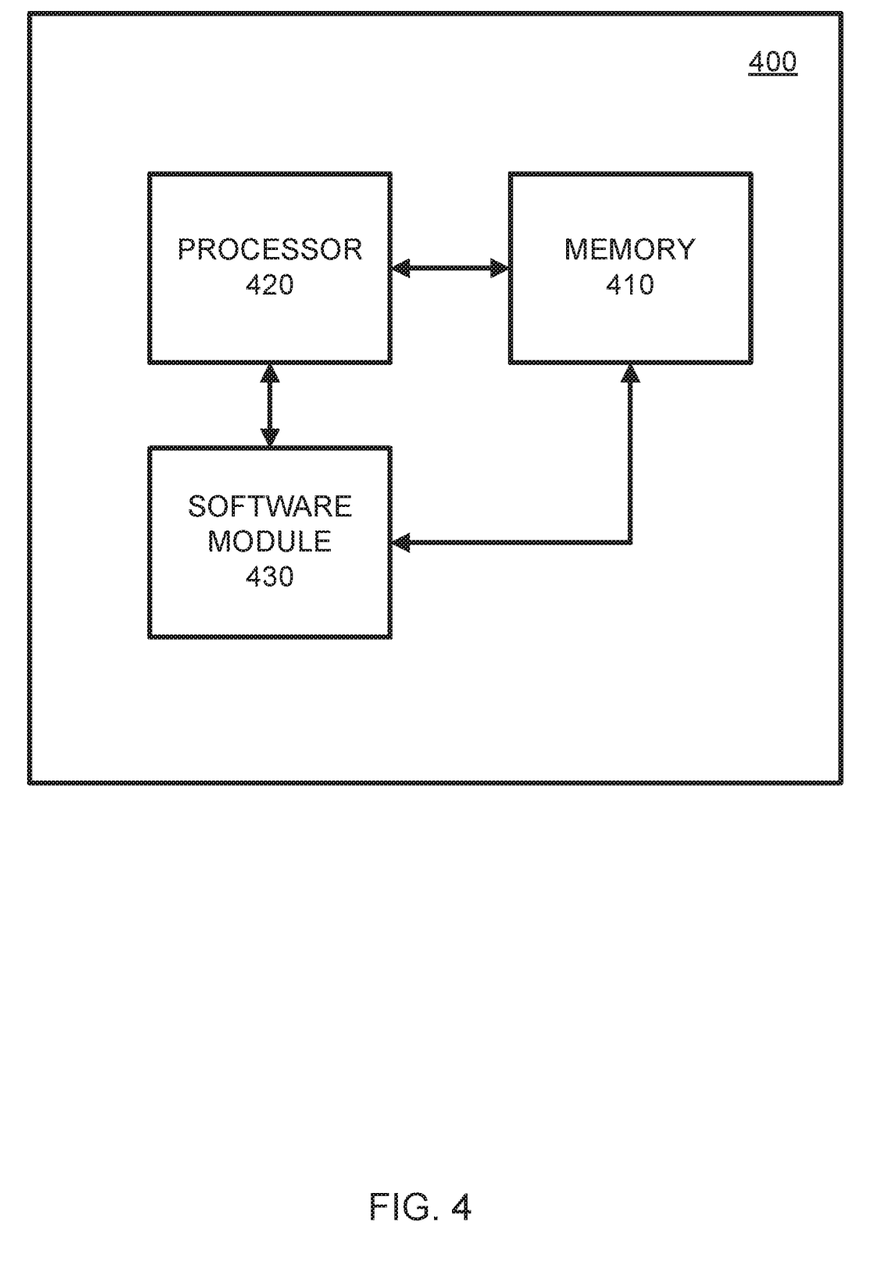
FIG. 4 illustrates an example network entity configured to support one or more of the example embodiments.

As illustrated in FIG. 4, a memory 410 and a processor 420 may be discrete components of a network entity 400 that are used to execute an application or set of operations as described herein. The application may be coded in software in a computer language understood by the processor 420, and stored in a computer readable medium, such as, a memory 410. The computer readable medium may be a non-transitory computer readable medium that includes tangible hardware components, such as memory, that can store software. Furthermore, a software module 430 may be another discrete entity that is part of the network entity 400, and which contains software instructions that may be executed by the processor 420 to effectuate one or more of the functions described herein. In addition to the above noted components of the network entity 400, the network entity 400 may also have a transmitter and receiver pair configured to receive and transmit communication signals (not shown).

Although an exemplary embodiment of at least one of a system, method, and non-transitory computer readable medium has been illustrated in the accompanied drawings and described in the foregoing detailed description, it will be understood that the application is not limited to the embodiments disclosed, but is capable of numerous rearrangements, modifications, and substitutions as set forth and defined by the following claims. For example, the capabilities of the system of the various figures can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way, but is intended to provide one example of many embodiments. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed, but is merely representative of selected embodiments of the application.

One having ordinary skill in the art will readily understand that the above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A method, comprising:
identifying, via one or more peer nodes of a plurality of peer nodes comprising a processor in a blockchain network, a blockchain transaction containing information associated with an operation of a smart contract;
storing the blockchain transaction in a blockchain ledger of the blockchain network;
assigning, by the processor, the blockchain transaction a transaction number and a block number identifying a location of the blockchain transaction in the blockchain ledger;
generating, via the one or more peer nodes, and based on a mask specified by declarative language of the smart contract, a blockchain index containing index data related to transaction data associated with the blockchain transaction, the blockchain index identifying, based on the mask, a subset of the transaction data in the blockchain ledger, and wherein the index data in the blockchain index is not linked to information in the blockchain ledger;
generating, via the one or more peer nodes, an index key associated with the blockchain index by hashing the transaction data associated with the blockchain transaction based on the declarative language of the smart contract;
and
updating, by the processor, the blockchain index based on a hashed portion of the transaction data.

2. The method of claim 1, wherein the updating the blockchain index further comprises:
adding a new entry to the blockchain index comprising the hashed portion of the transaction data and the block number.

3. The method of claim 1, wherein the declarative language specifies range values to enable searching of the blockchain index.

4. The method of claim 1, further comprising:
broadcasting the blockchain index to a plurality of blockchain peers.

5. The method of claim 1, wherein the generating the index key further comprises:
generating the index key using a cryptographic hash function.

6. The method of claim 5, wherein a subset of index entries of the blockchain index are encrypted with a same or different cryptographic key.

7. The method of claim 1, further comprising:
storing the blockchain index in the blockchain ledger.

8. An apparatus, comprising:
a processor configured to:
identify, via one or more peer nodes of a plurality of peer nodes in a blockchain network, a blockchain transaction containing information associated with an operation of a smart contract;
store the blockchain transaction in a blockchain ledger of the blockchain network;
assign the blockchain transaction a transaction number and a block number identifying a location of the blockchain transaction in the blockchain ledger;
generate, via the one or more peer nodes, and based on a mask specified by declarative language of the smart contract, a blockchain index containing index data related to transaction data associated with the blockchain transaction, the blockchain index identifying, based on the mask, a subset of the transaction data in the blockchain ledger, and wherein the index data in the blockchain index is not linked to information in the blockchain ledger;
generating, via the one or more peer nodes, an index key associated with the blockchain index by hashing the transaction data associated with the blockchain transaction based on the declarative language of the smart contract;
and
update the blockchain index based on a hashed portion of the transaction data.

9. The apparatus of claim 8, wherein the processor is further configured to:
add a new entry to the blockchain index comprising the hashed portion of the transaction data and the block number.

10. The apparatus of claim 8, wherein the declarative language specifies range values to enable searching of the blockchain index.

11. The apparatus of claim 8, wherein the processor is further configured to:
broadcast the blockchain index to a plurality of blockchain peers.

12. The apparatus of claim 8, wherein, when the processor is configured to generate the index key, the processor is further configured to:
generate the index key using a cryptographic hash function.

13. The apparatus of claim 8, wherein a subset of index entries of the blockchain index are encrypted with a same or different cryptographic key.

14. The apparatus of claim 8, wherein the processor is further configured to:
store the blockchain index in the blockchain ledger.

15. A non-transitory computer readable storage medium configured to store one or more instructions that when executed by a processor cause the processor to perform:
identifying, via one or more peer nodes of a plurality of peer nodes in a blockchain network, a blockchain transaction containing information associated with an operation of a smart contract;
storing the blockchain transaction in a blockchain ledger of the blockchain network;
assigning the blockchain transaction a transaction number and a block number identifying a location of the blockchain transaction in the blockchain ledger;
generating, via the one or more peer nodes, and based on a mask specified by declarative language of the smart contract, a blockchain index containing index data related to transaction data associated with the blockchain transaction, the blockchain index identifying, based on the mask, a subset of the transaction data in the blockchain ledger, and wherein the index data in the blockchain index is not linked to information in the blockchain ledger;
generating, via the one or more peer nodes, an index key associated with the blockchain index by hashing the transaction data associated with the blockchain transaction based on the declarative language of the smart contract;
and
updating the blockchain index based on a hashed portion of the transaction data.

16. The non-transitory computer readable storage medium of claim 15, wherein the updating the blockchain index further comprises:
adding a new entry to the blockchain index comprising the hashed portion of the transaction data and the block number.

17. The non-transitory computer readable storage medium of claim 15, wherein the declarative language specifies range values to enable searching of the blockchain index.

18. The non-transitory computer readable storage medium of claim 15, further comprising one or more instructions that when executed by the processor cause the processor to perform:
broadcasting the blockchain index to a plurality of blockchain peers.

19. The non-transitory computer readable storage medium of claim 15, wherein generating the index key further comprises:
generating the index key using a cryptographic hash function.

20. The non-transitory computer readable storage medium of claim 15, further comprising one or more instructions that when executed by the processor cause the processor to perform:
storing the blockchain index in the blockchain ledger, and wherein a subset of index entries of the blockchain index are encrypted with a same or different cryptographic key.

* * * * *